United States Patent
Weindorf et al.

(10) Patent No.: US 10,486,632 B2
(45) Date of Patent: Nov. 26, 2019

(54) DISPLAY STRUCTURE WITH A FLUSH APPEARANCE FOR A VEHICLE-BASED IMPLEMENTATION

(71) Applicant: VISTEON GLOBAL TECHNOLOGIES, INC., Van Buren Township, MI (US)

(72) Inventors: Paul Fredrick Luther Weindorf, Van Buren Township, MI (US); James F. Krier, Van Buren Township, MI (US)

(73) Assignee: Visteon Global Technologies, Inc., Van Buren Township, MI (US)

(*) Notice: Subject to any disclaimer, the term of this patent is extended or adjusted under 35 U.S.C. 154(b) by 137 days.

(21) Appl. No.: 15/622,780

(22) Filed: Jun. 14, 2017

(65) Prior Publication Data

US 2017/0361797 A1 Dec. 21, 2017

Related U.S. Application Data

(60) Provisional application No. 62/351,455, filed on Jun. 17, 2016.

(51) Int. Cl.
| | |
|---|---|
| *B60R 21/045* | (2006.01) |
| *B60K 37/02* | (2006.01) |
| *G06F 3/044* | (2006.01) |
| *B60K 35/00* | (2006.01) |
| *G06F 1/16* | (2006.01) |
| *B60R 21/00* | (2006.01) |

(52) U.S. Cl.
CPC ............ *B60R 21/045* (2013.01); *B60K 35/00* (2013.01); *B60K 37/02* (2013.01); *G06F 1/1637* (2013.01); *G06F 3/044* (2013.01); *B60K 2370/152* (2019.05); *B60K 2370/39* (2019.05); *B60K 2370/693* (2019.05); *B60K 2370/774* (2019.05); *B60K 2370/91* (2019.05); *B60R 2021/0048* (2013.01)

(58) Field of Classification Search
CPC .......................... G06F 3/044; B29C 45/14336
See application file for complete search history.

(56) References Cited

U.S. PATENT DOCUMENTS

| | | | |
|---|---|---|---|
| 6,088,069 A | 7/2000 | Farlow | |
| 2012/0170284 A1* | 7/2012 | Shedletsky | ......... G02F 1/13318 362/355 |
| 2012/0275026 A1 | 11/2012 | Zhou et al. | |
| 2013/0176240 A1 | 7/2013 | Autran et al. | |
| 2013/0294017 A1* | 11/2013 | Ota | ...................... G02F 1/1333 361/679.01 |
| 2014/0239781 A1 | 8/2014 | Allore et al. | |
| 2014/0285471 A1 | 9/2014 | Beraud et al. | |
| 2014/0308469 A1 | 10/2014 | Aida et al. | |
| 2016/0004350 A1* | 1/2016 | Zilbauer | ................ G02B 1/115 428/212 |

* cited by examiner

*Primary Examiner* — Kevin M Nguyen
(74) *Attorney, Agent, or Firm* — Quinn IP Law

(57) ABSTRACT

Disclosed herein are structures and methods for assembling said structures to provide a glass-based and flush implementation of a display structure for a vehicle-based context. Employing the aspects disclosed herein, an implementer is provided a structure capable of passing head-impact tests, while prevent stray shard creation and providing an aesthetically superior design to convention implementation.

20 Claims, 5 Drawing Sheets

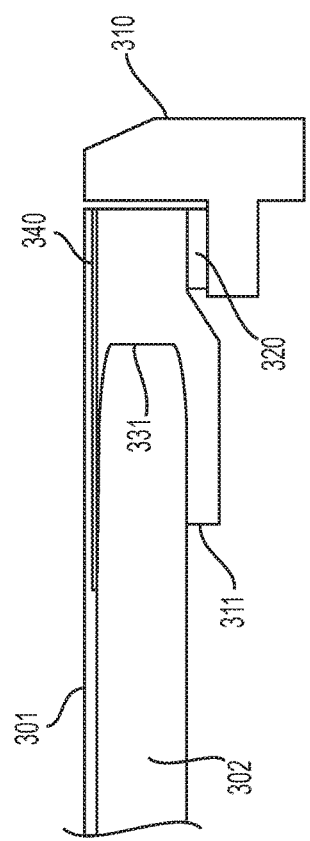
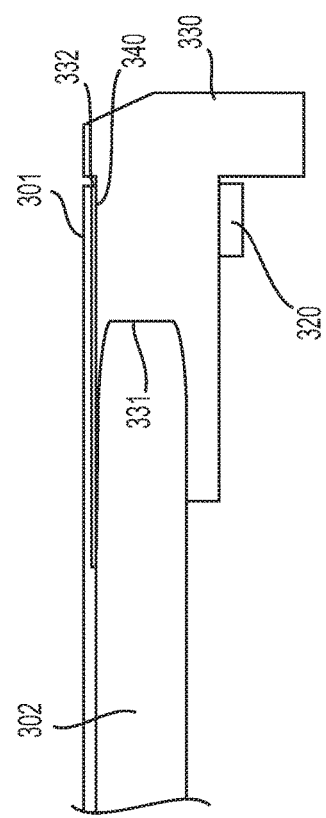
FIG. 3A
FIG. 3B

DISPLAY STRUCTURE WITH A FLUSH APPEARANCE FOR A VEHICLE-BASED IMPLEMENTATION

CROSS-REFERENCE TO RELATED APPLICATION

This patent application claims priority to U.S. Provisional Application No. 62/351,455, filed Jun. 17, 2016, entitled "HEAD IMPACT RESISTANT GLASS LENS CONSTRUCTION METHOD,". This patent application contains the entire Detailed Description of U.S. Provisional Patent application No. 62/351,455.

BACKGROUND

As displays are utilized more often in automotive applications, the use of touch lenses in front of the display is becoming more prevalent. These touch lenses may either have an air gap between the display and the touch lens, or be optically bonded to the display.

There is also a desire to provide a flush touch lens appearance as demonstrated in many mobile devices currently available. This is superior to a "picture frame" type geometry that has a raised wide border above the surface of the touch surfaces.

FIG. 1(a) illustrates an example of a flush mobile device 100, with a bezel 102 and a touch screen 101. As shown, the bezel 102 and the touch screen 101 are substantially level, thereby providing a smooth interface.

On the contrary, FIG. 1(b) illustrates a mobile device 110, with a raised bezel 112 and a touch screen 111. The device 110 is considered less favorable, as it is considered to be less aesthetically pleasing to an end consumer of the mobile device.

Automotive touch lens applications have regulatory safety requirements depending on the location in the vehicle. In general, in order to achieve a flush appearance and pass automotive head impact testing, such as ECE21 & FMVSS201, most solutions require the use of a plastic substrate lens in order to prevent hazardous glass sharp edge exposure and expulsion. However there is a desire to use a glass front lens for a thinner more rigid structure with superior optical characteristics. It is generally considered very risky to use an exposed glass lens. Although a thin plastic film has be applied to the front surface to contain glass shards under a head impact event, generally there is a problem with sharp edges or detached glass expulsion around the perimeter of the part.

SUMMARY

The following description relates to a display structure with a flush appearance for a vehicle-based implementation. Exemplary embodiments may also be directed to any of the system, the method, or an application disclosed herein, and the manufacture and assembly of the same.

Additional features of the invention will be set forth in the description which follows, and in part will be apparent from the description, or may be learned by practice of the invention.

A display structure for a vehicle. The display includes a glass substrate with a tapered edge; an in-molded plastic part, molded to conform around the tapered edge; a laminated plastic film disposed to overlap the glass substrate and the in-molded plastic part, wherein the laminated plastic film is on a surface opposing a viewer of the display structure.

In another example, the in-molded plastic part is a one-piece structure.

In another example, the in-molded plastic part is a two-piece structure.

In another example, the display includes a gasket, and the gasket is configured to absorb a load placed on the display.

In another example, the laminated film has a coating.

In another example, the laminated film may be defined as one of the following: anti-reflective (AR) coating, anti-glare (AG) coating, both anti-reflective (AR) coating and anti-glare (AG) coating, with black printing, and anti-fingerprint coating.

In another example, the black printing may be further defined as one of: infrared (IR) transmissive ink or low conductive inks for capacitive touch applications.

Also disclosed herein are methods for assembling the structures.

It is to be understood that both the foregoing general description and the following detailed description are exemplary and explanatory and are intended to provide further explanation of the invention as claimed. Other features and aspects will be apparent from the following detailed description, the drawings, and the claims.

DESCRIPTION OF THE DRAWINGS

The detailed description refers to the following drawings, in which like numerals refer to like items, and in which:

FIGS. 3(a) and (b) illustrate an exemplary embodiment according to the aspects disclosed herein.

DETAILED DESCRIPTION

Figure 1A:
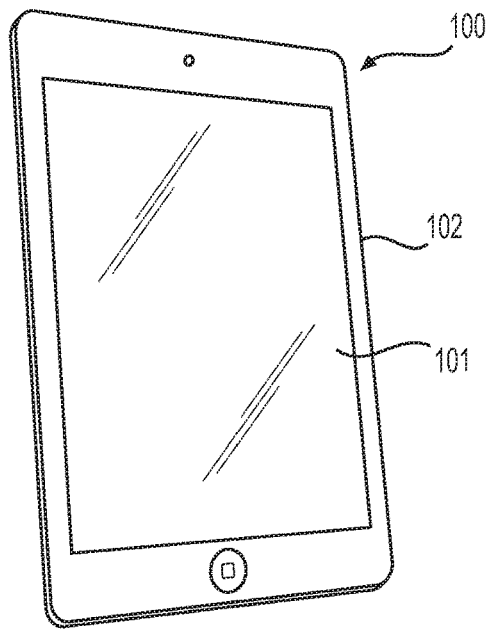
FIGS. 1(a) and (b) illustrate example mobile device according to conventional designs.
Figure 1B:
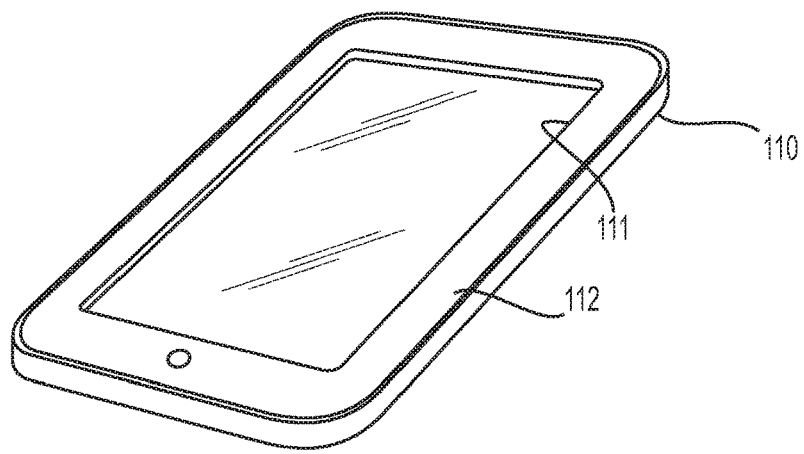

The invention is described more fully hereinafter with references to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. It will be understood that for the purposes of this disclosure, "at least one of each" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g. XYZ, XZ, YZ, X). Throughout the drawings and the detailed description, unless otherwise described, the same drawing reference numerals are understood to refer to the same elements, features, and structures. The relative size and depiction of these elements may be exaggerated for clarity, illustration, and convenience.

It is an object of the proposed solution to simultaneously pass the following requirements:

1) Compliance with automotive safety standards;
2) Satisfying craftsmanship (or aesthetic) demands;
 a. Providing a flush thin border customer perceived appearances;

b. Providing higher stiffness compared to plastic substrate solutions;

3) Providing optical performance, such as those achieved with the implementation of glass;
   a. Low birefringence—birefringence is the optical property of a material having a refractive index that depends on the polarization and propagation direction of light. These optically anisotropic materials are said to be birefringent (or birefractive);

4) Maintenance of linearly polarized light emission.

Figure 2A:
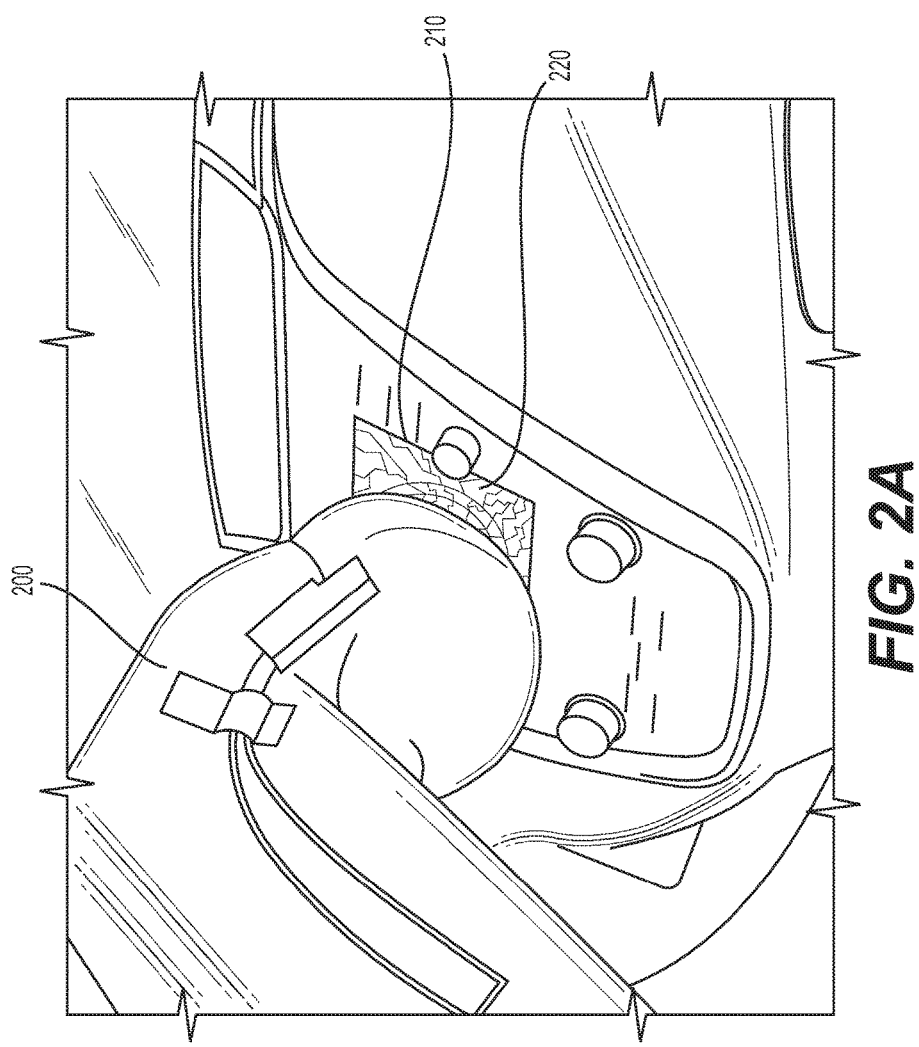
FIGS. 2(a) and (b) illustrate an overview of the head impact test and examples of results.

The actual regulatory specifications for passing ECE21 & FMVSS201 (or other standards not disclosed) are quite complex so a simplified explanation will be given. FIG. 2(a) illustrates a typical head impact test. As shown, a crash test dummy 200 is accelerated into a surface (head form) 210 to produce a shattered piece 220.

In performing the test shown in FIG. 2(a), there are two primary requirements that must be satisfied:

1) Energy Absorption—at the vehicle level, an accelerometer equipped device that simulates an occupant's head makes contact with the instrument panel. The deceleration of the head form shall not exceed 80 (acceleration of gravity) g continuously for more than 3 milliseconds (ms); and 2) Sharp Edges: head form tested items shall not contain any dangerous roughness or sharp edges likely to increase the risk of serious injury to the occupants. This can include broken edges after test as well as detachment of pieces during the test. ECE21 has additional restriction on radius and projection heights of objects that FMVSS 201 does not specify.

In general, the energy absorption criterion is satisfied by engineered deformation of the various components in the instrument panel. Ductile materials that can deform without breaking are generally used for appearance items which often favor impact resistant plastics. If more brittle materials (i.e. likely to shatter into numerous pieces) are desired like glass, the deformation must be strictly limited to avoid breakage. This reduces energy absorption of that component and places a burden on other components in the instrument panel to work within the 80g limit noted above as a requirement for several tests.

Figure 2B:
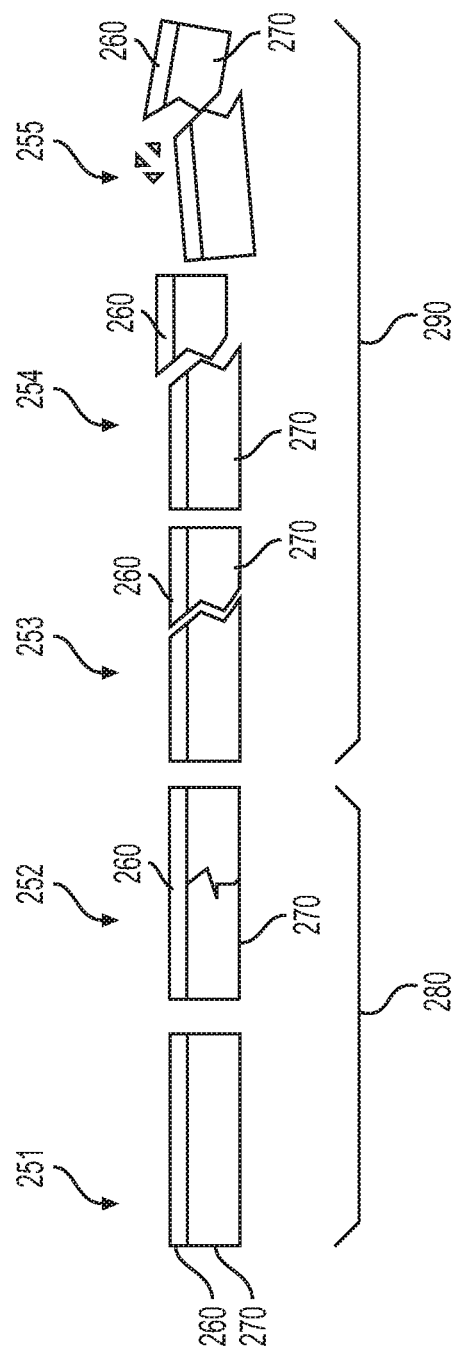

As shown in FIG. 2(b), five different permutations (251-255) of a head form 210 is shown. As shown, a top surface 260 is shown (e.g. a film or cover), along with a lens piece 270. In the examples shown, cases 280 are considered passing tests, while cases 290 are seen as failed tests. The reason for this is that the cases shown in 290 results in shards being created that may be projected towards a driver or passenger in a vehicle.

Disclosed herein are structures and methods for providing a flush appearance employing glass substrates for a vehicle-based display structure. The structures and the methods for implementing said structures exhibit superior qualities with regards to head-impact testing.

Figure 4:
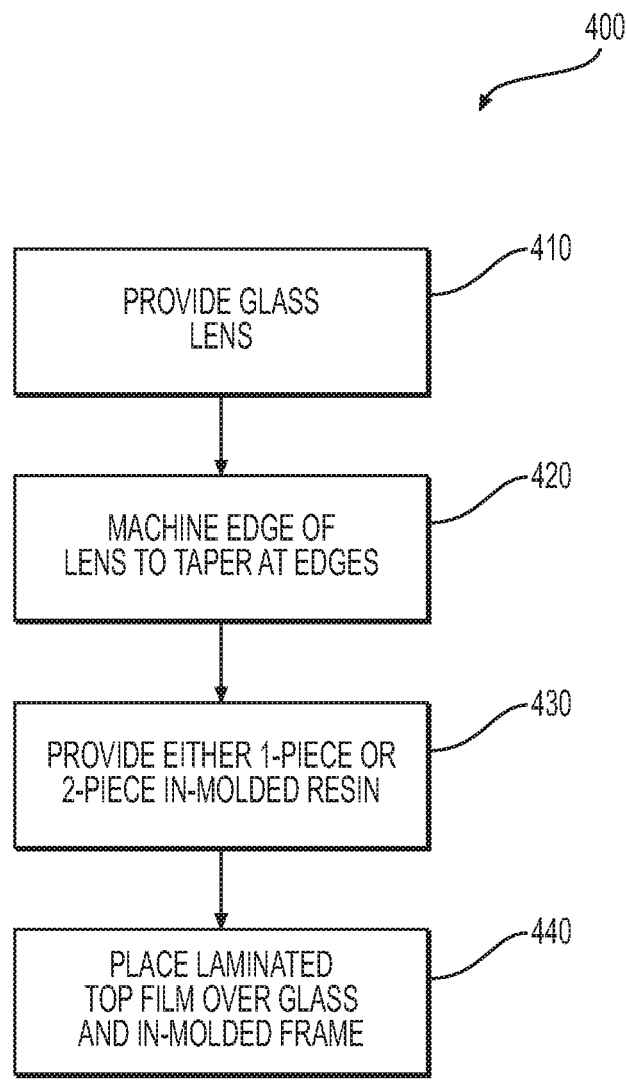
FIG. 4 illustrates an example method for implementing the structures of FIGS. 3(a) and (b).

FIGS. 3(a) and (b) illustrate an example of the structures disclosed herein. These structures (which are alternate embodiments) will be described in greater detail along with the method 400 shown in FIG. 4. The method 400 explains the assembly of the various elements in the structures shown in FIGS. 3(a) and (b).

The method 400 first requires to the provision of a glass substrate 302 (operation 410). This glass substrate 302 is tapered at the edges 331 to allow fitting with an in-molded structure (420).

As explained above, the tapered edges are surrounded with an adaptation of an in-mold plastic border around the perimeter of the glass substrate 302 (operation 430). FIG. 3(a) illustrates a two-piece embodiment (with in-mold resin 311 and part 310 additionally provided), while FIG. 3(b) illustrates a one-piece embodiment (330). In either case, a gasket 320 is provided. The gasket 320 may be of a rubber-type or elastomeric material, and be provided so as to absorb a load that may hit the plastic film during an accident or impact.

In operation 440, a plastic film 301 is laminated and provided over the in-molded plastic frame (311 or 330) and the glass interface (302). The lamination and provision of the plastic film 301 ensures that glass shards are contained in response to impact (such as those shown in FIG. 2(a)).

The molded plastic frame (311 and 330) and its mating with the glass substrate 302 also aids in avoiding exposure of glass edges. Alternatively, or in addition to, more impact resistant materials for the frame (elastomeric materials like TPE or others) would provide further improvement of the frame to avoid breakage during impact.

As shown above, the film 301 overlaps a glass substrate 302 and a plastic element (311 or 330). The problem in conventional designs has been the edges. If film over the glass is only brought to the glass to the edge, shards explode out of the edge. The cross sections shown in FIGS. 3(a) and (b) illustrate how the frame through the introduction of ledge 332 hides the edge of the film 301. Thus, the aesthetics are improved, as well as avoiding a film edge that could be picked at by consumers.

Applicants have performed tests with the above-described structures, and have achieved no delamination problems between the border layers (311 or 330) and the glass substrate 302.

Employing the aspects disclosed herein, and especially focusing on the use of a glass substrate (as opposed to a plastic substrate) has shown improved stiffness compared to plastics due to an increased modulus of elasticity. In one example, the following results are used:

Glass Modulus of Elasticity (302): 75 Gpa;

Optical Plastic Modulus of Elasticity (310/311 or 330): 2.3 Gpa;

For a given geometry and thickness, glass has 75/2.3=32.6 times the stiffness. By employing the ratio above, Applicants have discovered that said ratio prevents display push mura defects for direct bonded displays, and promotes an overall improved aesthetic display for glass lens. Furthermore, a dielectric properties and thickness of glass employed in this scenario provides for an improved touch capability of the display.

The front films may be based on a TAC substrate with an optical adhesive. The optical adhesive employed achieves a passage of head impact testing with bezel protection around the edge to contain edge shards. The adhesive is aids in-head impact testing compliance. By employing the concepts disclosed, the adhesive is separate-able, and thus allows the glass to break without tearing the film.

The films employed herein may have a variety of surface coatings to enhance both optical and mechanical performance such as:

Anti-reflective (AR) coating

Anti-glare (AG) coatings with superior performance to glass AG coatings

AGAR coatings (black printing 340)

Anti-fingerprint or anti-smudge coatings

The black printing 340 may be of any type of ink including the use of IR transmissive ink or low conductive inks for capacitive touch applications. It should be noted that the disclosed structures optical stackup configuration provides low optical retardation (birefringence) compared to plastic lens solutions which is important for display viewability with polarized sunglasses. Current art using high impact grade optical plastic lens either has relatively high birefringence with poor polarized sunglass view-ability or requires additional specialty optical films in the form of super retardation films (SRF) with very high retardation behind the plastic lens to scatter the plastic lens retardation to the polarized sunglass user. SRF films reduce optical transmission and disrupt the linear polarization of the display which can have adverse effects in the vehicle in the form of increased scattering of light on windshields.

The proposed head impact resistant lens construction method allows the use of a glass lens which will pass automotive head impact testing. Some of the benefits are:
  Head impact compliance
  Improved substrate optical properties
  Improved craftsmanship
  Front surface coating film flexibility
  Improved glass attachment As a person skilled in the art will readily appreciate, the above description is meant as an illustration of implementation of the principles this invention. This description is not intended to limit the scope or application of this invention in that the invention is susceptible to modification, variation and change, without departing from spirit of this invention, as defined in the following claims.

We claim:

1. A display structure for a vehicle, comprising:
   a glass substrate with a tapered edge provided by tapered portions on opposite sides of the glass substrate, the tapered portions being opposite one another around a periphery of the glass substrate;
   an in-molded plastic part, molded to conform around both of the tapered portions of the tapered edge, the in-molded plastic part having two lips in contact with the glass substrate that extend inward from the periphery of the glass substrate, a first one of the lips having an outer surface that is substantially flush with a planar display surface of the glass substrate opposing a viewer of the display structure, whereby the first lip does not extend beyond the corresponding tapered portion; and
   a laminated plastic film disposed to overlap both the glass substrate and the first lip of the in-molded plastic part,
     wherein the laminated plastic film overlaps a seam formed where the glass substrate and the first lip meet, and
     the laminated plastic film is adhered to the glass substrate by an optical adhesive which, in use, delaminates from the glass substrate when the glass substrate breaks.

2. The display structure according to claim 1, wherein the in-molded plastic part is a one-piece structure having an outer boundary.

3. The display structure according to claim 2, further comprising a gasket, wherein the gasket is configured to absorb a load placed on the display.

4. The display structure according to claim 2, further comprising a gasket installed between the one-piece structure of the in-molded plastic part and the vehicle, and between the glass substrate and the outer boundary of the in-molded plastic part,
   wherein the gasket is compressed to absorb an external load applied normal to the planar display surface of the glass substrate.

5. The display structure according to claim 1, wherein the in-molded plastic part is a two-piece structure,
   a first piece of the two-piece structure conforms to the tapered portions of the glass substrate, and
   a second piece of the two-piece structure supports the first piece.

6. The display structure according to claim 5, further comprising a gasket installed between the first piece and the second piece of the in-molded plastic part, and between the glass substrate and the second piece of the in-molded plastic part,
   wherein the gasket is compressed to absorb an external load applied normal to the planar display surface of the glass substrate.

7. The display structure accord to claim 1, wherein the laminated plastic film has a coating.

8. The display structure according to claim 7, wherein the coating is defined as anti-reflective (AR) coating.

9. The display structure according to claim 7, wherein the coating is defined as anti-glare (AG) coating.

10. The display structure according to claim 7, wherein the coating is defined as both anti-reflective (AR) coating and anti-glare (AG) coating, with black printing.

11. The display structure according to claim 10, wherein the black printing is defined as infrared (IR) transmissive ink.

12. The display structure according to claim 10, wherein the black printing is defined as low conductive inks for capacitive touch applications.

13. The display structure according to claim 7, wherein the coating is defined as anti-fingerprint coating.

14. The display structure according to claim 1, wherein the tapered portions have oppositely symmetric profiles.

15. The display structure according to claim 1, wherein an angle of taper of each tapered portion relative to a central plane of the glass substrate increases toward the periphery of the glass substrate.

16. A method implementing a display structure in a vehicle for passing head impact tests, comprising:
   providing a glass substrate;
   tapering edges of the glass substrate to provide tapered portions on opposite sides of the glass substrate, the tapered portions being opposite one another around a periphery of the glass substrate;
   in-molding a plastic resin to form an in-molded plastic part that conforms around both of the tapered portions of the edges, the in-molded plastic part having two lips in contact with the glass substrate that extend inward from the periphery of the glass substrate, a first one of the lips having an outer surface that is substantially flush with a planar display surface of the glass substrate opposing a viewer of the display structure, whereby the first lip does not extend beyond the corresponding tapered portion; and
   providing a laminated plastic film on both the planar display surface of the glass substrate and the first lip of the in-molded plastic part,
     wherein the laminated plastic film overlaps a seam formed where the glass substrate and the first lip meet, and
     the laminated plastic film is adhered to the glass substrate by an optical adhesive which, in use, delaminates from the glass substrate when the glass substrate breaks.

17. The method according to claim 16, wherein the tapered portions have oppositely symmetric profiles.

18. The method according to claim 16, wherein an angle of taper of each tapered portion relative to a central plane of the glass substrate increases toward the periphery of the glass substrate.

19. The method according to claim 16, wherein the in-molded plastic part is formed as a one-piece structure having an outside boundary, the method further comprising:
- installing a gasket between the one-piece structure of the in-molded plastic part and the vehicle, and between the glass substrate and the outside boundary of the in-molded plastic part,
- wherein the gasket is compressed to absorb an external load applied normal to the planar display surface of the glass substrate.

20. The method according to claim 16, wherein the in-molded plastic part is formed as a two-piece structure, a first piece of the two-piece structure that conforms to the tapered portions of the glass substrate, and a second piece of the two-piece structure that supports the first piece, the method further comprising:
- installing a gasket between the first piece and the second piece of the in-molded plastic part, and between the glass substrate and the second piece,
- wherein the gasket is compressed to absorb an external load applied normal to the planar display surface of the glass substrate.

* * * * *